(No Model.)

A. B. McDOWELL.
SNAP HOOK.

No. 491,852. Patented Feb. 14, 1893.

WITNESSES:
Fred G. Dreterich
Amos W. Hart

INVENTOR:
A. B. McDowell.
BY
ATTORNEYS

UNITED STATES PATENT OFFICE.

ANTHONY B. McDOWELL, OF EDNA, TEXAS.

SNAP-HOOK.

SPECIFICATION forming part of Letters Patent No. 491,852, dated February 14, 1893.

Application filed April 11, 1892. Serial No. 428,677. (No model.)

*To all whom it may concern:*

Be it known that I, ANTHONY B. MCDOWELL, a citizen of the United States, residing at Edna, Jackson county, and State of Texas, have invented an Improvement in Snap-Hooks, of which the following is a specification.

My invention is adapted for general use but particularly as an attachment for riding saddles and harness, as a means of suspension for whips, ropes, or other articles.

Figure 1:
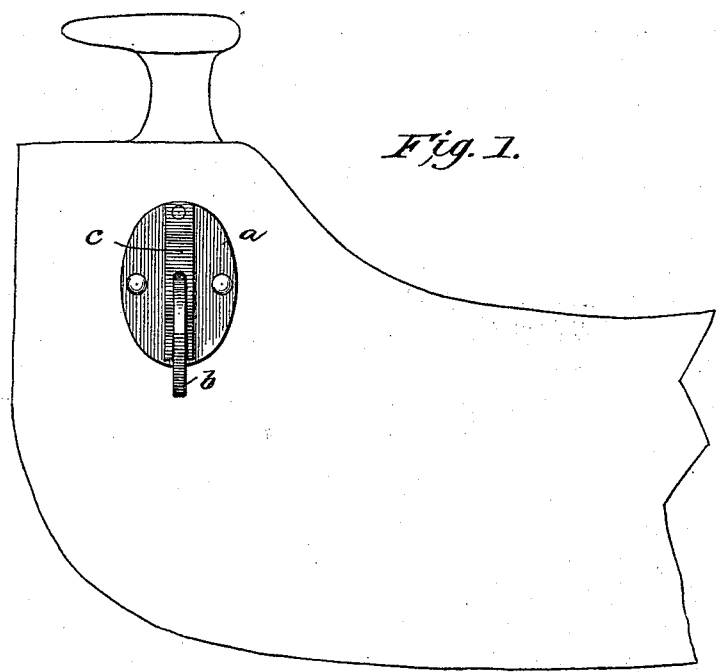
Figure 2:
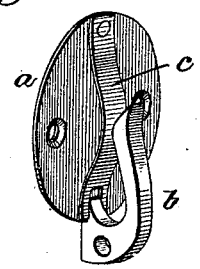
Figure 3:
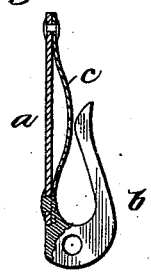

In the accompanying drawings, Figure 1 shows the device applied to a riding saddle, Fig. 2 is a perspective view of the device detached, and Fig. 3 is a lengthwise section of the same.

It consists of a plate $a$, the hook $b$, and a curved plate spring $c$, relatively constructed and arranged as hereinafter described. The said plate $a$, is represented as flat and oval in form; but it may have various contours, and may be curved, instead of flat, to adapt it to the conformation of the surface of the object to which it is to be attached. The hook is either formed integral with the plate, $a$, or riveted to it; and, in any case, its slightly-curved arm extends over the plate, and its point is bent upward as shown. The steel plate spring $c$, is riveted to that end of the plate $a$, which is opposite the one to which the hook is secured, and it extends forward toward the shank of the hook and curves upward beneath its downwardly-projecting point. Thus, the convexities of the hook and spring meet or closely approach each other, and thereby serve to prevent accidental detachment of any article or device suspended from the hook. It will be seen that the upward bend of the point of the hook is a very important feature, since it enables a rope, ring, or other device to be easily and quickly drawn into or out of the hook. The free extremity of the spring rests on the plate, and is also curved downward and notched or bifurcated to adapt it to embrace the base of the hook shank, which connection prevents lateral displacement of the spring, as will be readily apparent.

The plate, $a$, is provided with countersunk holes to receive screws, for attaching the device to any object—as, for example, to the side of the pommel of a riding saddle—for use in suspending a whip, rope, or other article; or to the top of a harness-saddle, to serve as a water or check-rein hook; or to any other portion of a saddle or harness, for suspending anything that convenience may require.

It will be observed that articles may be attached to and detached from the hook without requiring the spring to be depressed by manual pressure.

The spring may obviously be made of any other metal than steel, which is suited for the purpose.

The small hole in the shank of the hook is for reception of a string that may be used for securing a rope that is suspended from the hook.

The device is very simply and cheaply constructed but very convenient, serviceable, and effective in use.

Having thus described my invention, what I claim is—

As an improved article of manufacture, the snap-hook for use in suspending articles as hereinbefore described, composed of the flat, or approximately flat, plate, $a$, having screw holes, the hook $b$, rigidly secured to the edge of the plate and curved backward over its surface, and the upwardly-bent plate spring $c$, secured to the edge of the plate, $a$, at a point opposite the hook and having a forked free end which embraces the shank of the hook, as shown and described.

ANTHONY B. MCDOWELL.

Witnesses:
 L. F. WELLS,
 HUGH L. WHITE.